Figure 1:
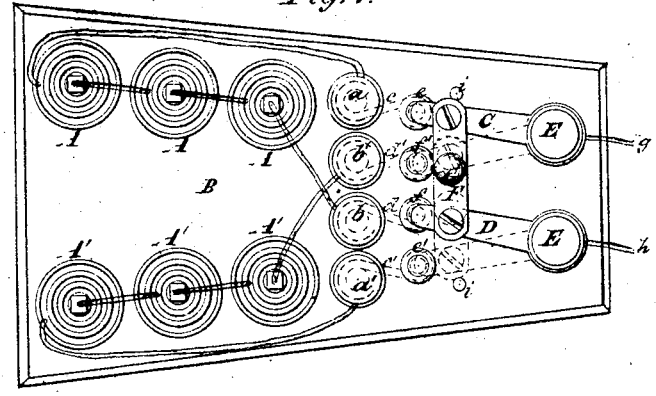
Figure 2:
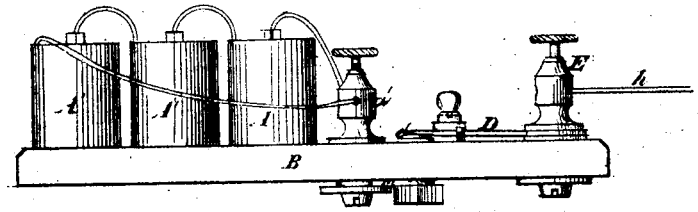

Edwin D. McCracken's Imp.t in Galvanic Batteries.

No. 106383      Patented Aug 16 1870

Witnesses
Fred. Haynes
R. T. Rabeau

Edwin D. McCracken

United States Patent Office.

EDWIN D. McCRACKEN, OF NEW YORK, N. Y.

Letters Patent No. 106,383, dated August 16, 1870.

IMPROVEMENT IN GALVANIC BATTERIES.

The Schedule referred to in these Letters Patent and making part of the same.

*To all whom it may concern:*

Be it known that I, EDWIN D. MCCRACKEN, of the city, county, and State of New York, have invented a new and useful Improvement in Galvanic Batteries; and I do hereby declare that the following is a full, clear, and exact description of the same, reference being had to the accompanying drawing forming part of this specification.

The object of this invention is to obviate the difficulty and inconvenience which result from the failure of continuity of action of galvanic batteries, and the consequent necessity for frequent renewal of the chemicals. The invention is more especially advantageous in its application to what is known as the "electropoion" battery, but may be applied in connection with batteries of other kinds.

It consists in the combination of two or more batteries, and a switch, which is so arranged relatively to them as to allow either of the said batteries to be brought into the circuit of the telegraph line or other apparatus worked by the battery, the other or others being at the same time thrown out of the circuit, with their poles open. The switch being operated at regular or suitable intervals to bring each battery in turn into operation, and the other or others out of operation, each is, in turn, during the suspension of its operation, allowed to recover its strength and activity, while the circuit remains always in working order.

The switch may be operated by hand or by any suitable automatic or mechanical means, but, for the sake of illustrating my invention, I will describe it in its simplest form, viz., with two batteries and the switch operated by hand.

A A A and A' A' A' are two batteries arranged at any convenient distance from each other, and having their poles connected with separate binding-screws, *a b* and *a' b'*, secured in a board, B, the poles of the battery A A A being connected with the screws *a b*, and those of the battery A' A' A' with the screws *a' b'*.

The screws *a b* are connected, by wires, *c d*, with two metal buttons, *e f*, which project above the face of the board B, and the screws *a' b'* are connected by wires *c' d'* with two similar buttons *e' f'*, the said buttons being all insulated from each other, and all so arranged in a row that the two *e' f'* alternate with the two *e f*.

C D are two metal arms, which are capable of swinging horizontally on two binding-screws, E E, secured in the board B.

With these binding-screws the ends *g h* of the main, local, or other wire through which the batteries operate, are connected.

The arms C D constitute the switch, and they are connected together by a bar, F, of non-conducting material, to which is attached a knob, G, which serves as the handle of the switch.

The arms C D of the switch, and the buttons *e f* and *e' f'* are, respectively, at such distances apart that the said arms may bear one upon the button *e*, and the other upon the button *f*, as shown in bold outline in fig. 1, or one upon the button *e'* and the other upon the button *f'*, as shown in dotted outline in fig. 1, in the latter case connecting the battery A' A' A' with the wire *g h*, and in the former case connecting the battery A A A with the said wire, either battery being out of connection, with its poles open, while the other is connected.

On opposite sides of the switch are two stops, *i i*, to limit its movement to what is necessary to throw one and the other battery into the circuit of the wire *g h*.

The switch used in my invention may be variously constructed, and I should consider any device that might be used, however operated, to throw one battery into and another out of the circuit, as a switch, or its equivalent.

What I claim as my invention, and desire to secure by Letters Patent, is—

The combination, in the same electric circuit, of two or more batteries and a switch, arranged to bring each battery in turn into and out of the circuit, substantially as and for the purpose herein described.

EDWIN D. McCRACKEN.

Witnesses:
 FRED. HAYNES,
 R. E. RABEAU.